Patented Apr. 5, 1932

1,852,346

UNITED STATES PATENT OFFICE

HARRY L. FISHER, OF AKRON, OHIO, ASSIGNOR TO THE B. F. GOODRICH COMPANY, OF NEW YORK, N. Y., A CORPORATION OF NEW YORK

RUBBER CONVERSION PRODUCTS AND METHOD OF MAKING SAME

No Drawing.   Application filed December 28, 1926. Serial No. 157,621.

This invention relates to rubber conversion products and has for an object to provide compositions of the above indicated character which shall have both physical and chemical properties clearly distinguishing them from the rubber from which they are made. A further general object is to provide an improved process for the manufacture from rubber of these conversion products.

In my Patent No. 1,605,180, granted November 2, 1926, are described certain methods of preparing rubber isomers, including that of milling concentrated sulfuric acid into a mass of rubber and thereafter heating the mix sufficiently to produce a reaction within the mass. By this means rubber isomers having a considerable range of heat plasticity, toughness and brittleness are produced.

The present invention relates to the preparation of rubber conversion products which are similar in many respects to the rubber isomers of my earlier application above referred to. The present process however is carried out with rubber dissolved in a rubber solvent and to which solution is added a phenol and sulfuric acid, the admixture being heated at elevated temperature, as on a steam bath, for an extended period.

Experimentation has shown that rubber in solution when heated with phenol alone, or when treated with sulfuric acid alone, will not produce conversion products which are readily heat plastic at relatively low temperatures and which are easily soluble in the common rubber solvents, and that the rubber in the process of the present application is obviously converted into the desired heat-plastic conversion products by the cooperative catalyzing effect of both the phenol and the sulfuric acid. Moreover, numerous tests have demonstrated that desirable heat-plastic conversion products can only be formed at elevated temperatures and where the sulfuric acid employed is a relatively dilute acid. Preferably concentrated sulfuric acid (specific gravity 1.82) diluted with 1 to 5 volumes of water gives the most satisfactory results. The part that the phenol and sulfuric acid play, either cooperatively or individually, in the reaction of the present application has not at the present time been definitely determined, but it is believed that they act mutually in a catalytic capacity, since the resulting conversion product has the same empirical formula as the rubber from which it is made and the yield thereof is substantially quantitative, that is, practically the same amount by weight of the rubber conversion product is obtained as that of the original rubber employed. After the conversion reaction, the rubber solvent and the phenol may be recovered by distillation. The residual acid is preferably either removed from the conversion product by washing with water or neutralized with an alkali. The purified conversion product, the solvent, phenol and acid having been removed, is found to have a less unsaturation than the rubber from which it is produced.

The following examples are herein given to illustrate more in detail the process hereinabove described.

Example 1

As an illustration of the employment of phenol and sulfuric acid in the preparation of these conversion products, admix 5 parts by weight of rubber dissolved in benzene, for example as a 5 to 10% rubber solution, with 10 parts by weight of phenol, and 3.6 parts by weight of concentrated sulfuric acid to which 4 parts by weight of water are added to dilute the acid, the ingredients being thoroughly admixed, as by stirring. The order of mixing the ingredients is apparently immaterial, but the acid should be diluted before using it in the admixture. The mixture is then heated on a steam bath for two days in order to insure the completion of the conversion reaction. The reaction mixture is then subjected to steam distillation to drive off the rubber solvent and the phenol, leaving a solid residue comprising the conversion product. This product is preferably prepared for industrial uses by homogenizing, as by comminution, resolution in rubber solvents, or by breaking down on a warm rubber mill, and any residual acid may also be removed by washing the product with water, or the acid may be neutralized by treating with an alkali. The purified conversion product is a hard, tough, somewhat friable material which is readily heat-plastic at ordinary molding temperatures. Analysis shows it to be chemically less unsaturated than rubber. It is soluble in the common rubber solvents, such as benzene, gasoline, turpentine, chloroform, carbontetrachloride, and carbonbisulfide, giving colloidal solutions of lower viscosity than rubber and is practically insoluble in alcohol, ether, acetone, glacial acetic acid, aniline, water, and dilute acids and alkalies.

*Example 2*

In this example the above indicated reaction in a somewhat modified form is described, the method being suitable for quantity production of the rubber conversion products. Into 300 parts by weight of rubber (pale crepe) in a benzol solution, for example, a 5 to 10% rubber solution, 600 parts by weight of phenol, 220 parts by weight of concentrated sulfuric acid (sp. gr. 1.82), to which 240 parts by weight of water have been added to dilute the acid, are thoroughly admixed in a suitable receptacle, then subjected to normal steam bath temperatures for three days, the time of heating being amply sufficient to complete the conversion of the rubber. At the end of the heating period, the solvent and the phenol are distilled off by steam distillation, leaving a solid residue comprising the conversion product which is preferably washed with water to remove the residual acid. This product corresponds in all substantial respects as to its chemical and physical properties to the product hereinabove described in Example 1 and is found on test to have the following physical properties; Tensile strength, 560 pounds per square inch; transverse strength, 1900 lbs. per sq. in.; compressive strength 12,500 lbs. per sq. in.; softening temperature, 150° F. When formed into a cement and used as an adhesive between metal and a rubberized fabric it was found to be approximately 15 to 20 times stronger in its adhesive properties than the best rubber cements.

Balata, gutta percha, and the so-called methyl rubbers synthetically produced, have also been found to undergo a like conversion to that hereinabove described, and vulcanized scrap rubbers and reclaims which contain only minor proportions of pigments may also be converted by the above described processes into plastic products having properties somewhat of the character hereinabove described with respect to the rubber conversion products. Vulcanized scrap rubbers and reclaims which contain large percentages of pigments have been found not to be particularly satisfactory since the pigments in some cases neutralize the acid reagent and in all cases retard the conversion process. The term "rubber" as hereinafter employed in the claims is used in a general sense to include raw and vulcanized rubber, and rubber-like substances of the character herein referred to.

It will be understood that other rubber solvents than those mentioned in the above examples are operable, carbon tetrachloride, gasoline and tetrachlorethane having been satisfactorily employed in the process of this application. It is also to be understood that phenols other than phenol itself may be employed in this process and, although the latter has been found to be preferable, cresol, carvacrol, $\alpha$-naphthol, $\beta$-naphthol and catechol have also been satisfactorily employed. The conversion products hereinabove described may be vulcanized with sulfur by incorporating the sulfur with the rubber conversion product and subsequently heating at vulcanizing temperatures.

The rubber conversion products of this application find many commercial uses in the industrial arts. In solution they may be used as bases for the preparation of paints and waterproof coatings and for the preparation of adhesive cements. Where the conversion products are to be used in solution, I may, in some cases take the intermediate product obtained by heating the rubber solution with phenol and the acid reagent and without removing the solvent or the phenol employ this intermediate liquid product directly for, or as a base for, a coating material. It is generally desirable, however, to remove the acid because of its corrosive effects, particularly upon metals, and this may be accomplished by washing the intermediate liquid product with water to dissolve out the acid constituents thereof, or the acid in the intermediate liquid product may be neutralized by adding thereto an alkali, as by running ammonia gas therethrough.

Molded articles may be also made from the solid rubber conversion products which readily lend themselves to this use because of their heat-plasticity and their facility for mixing with fillers, pigments, etc., which are commonly employed in molding compositions.

While the procedure of the specific examples above given calls for the rubber to be first dissolved in an organic solvent, I find that the reaction may be equally well effected by admixing the rubber, preferably in small pieces, with the solvent, the phenol and the acid reagent. Upon heating, the rubber goes into solution, the phenol apparently assisting in the dissolution of the rubber. Where difficultly soluble rubbers are employed, such as vulcanized rubber, reclaimed rubber, etc., this method of procedure has been found to be highly advantageous.

While but two detailed examples have been given in this specification, it will be obvious to those skilled in the plastic arts that various modifications in the ingredients specified and in the time and temperature of carrying out the conversion reaction may be employed without departing from the principles of this invention.

I claim:

1. The method of preparing heat-plastic conversion products of rubber which comprises admixing rubber in solution with a phenol and dilute sulfuric acid, and heating the admixture.

2. The method of preparing heat-plastic conversion products which comprises forming an admixture of rubber in solution with a phenol and dilute sulfuric acid, and effecting a reaction among these substances by heating the admixture under reflux at approximately the boiling temperature of the solvent.

3. The method as set forth in claim 2 in which the resulting product is rendered non-acid in character.

4. The method as set forth in claim 2 in which the resulting product is rendered non-acid in character by neutralization of its acid content.

5. The method of preparing heat-plastic conversion products of rubber which comprises forming an admixture of rubber in solution with a phenol and dilute sulfuric acid, and effecting a reaction among these substances by heating the admixture at approximately the boiling temperature of the solvent to convert the rubber to a solid heat-plastic product, and thereafter recovering the solid heat-plastic constituents of the reaction mixture.

6. The method set forth in claim 5 in which the recovered heat-plastic is rendered non-acid in character.

7. The method set forth in claim 5 in which the recovered heat-plastic product is homogenized to prepare it for industrial uses.

8. A composition of matter comprising the reaction product of a rubber, a phenol and dilute sulfuric acid.

9. A composition of matter comprising the product of the reaction, under the influence of heat and in the presence of phenol, of rubber and dilute sulfuric acid.

10. A composition of matter comprising the product of the reaction, under the influence of heat and in the presence of phenol, of rubber in solution and dilute sulfuric acid.

11. The method of preparing heat-plastic conversion products of rubber which comprises admixing rubber, a rubber solvent, a phenol and dilute sulphuric acid, and heating the admixture to convert the rubber to a solid heat-plastic product, which may be recovered from the admixture by the removal of phenol, solvent and acid.

12. The method of preparing heat-plastic conversion products of rubber which comprises admixing rubber, a rubber solvent, a phenol and dilute sulphuric acid, the rubber being in excess of two per cent by weight of the reaction mixture, and heating the admixture.

13. The method of preparing heat-plastic conversion products of rubber which comprises admixing rubber, a rubber solvent, a phenol and dilute sulphuric acid, the phenol being in excess of two per cent by weight of the reaction mixture, and heating the admixture.

14. The method of preparing heat-plastic conversion products of rubber which comprises admixing rubber, a rubber solvent, a phenol and dilute sulphuric acid, the sulphuric acid before dilution being in excess of two per cent by weight of the reaction mixture, and heating the admixture.

In witness whereof I have hereunto set my hand this 20th day of November, 1926.

HARRY L. FISHER.